United States Patent [19]

Loshaek et al.

[11] 4,109,070

[45] Aug. 22, 1978

[54] METHOD OF PRODUCING OPTICALLY CLEAR HYDROPHILIC COPOLYMERS AND CONTACT LENSES

[75] Inventors: Samuel Loshaek; Chah M. Shen, both of Chicago, Ill.

[73] Assignee: Wesley-Jessen Inc., Chicago, Ill.

[21] Appl. No.: 804,260

[22] Filed: Jun. 7, 1977

[51] Int. Cl.² .................... C08F 220/20; C08L 31/02; C02B 3/00

[52] U.S. Cl. ............................. 526/77; 260/29.6 H; 351/160; 526/320

[58] Field of Search ................ 260/29.6 H; 351/159, 351/160; 526/320, 77

[56] References Cited

U.S. PATENT DOCUMENTS

| | | | |
|---|---|---|---|
| 3,784,540 | 1/1974 | Kliment et al. | 526/320 |
| 3,822,089 | 7/1974 | Wichterle | 526/216 |
| 3,893,988 | 7/1975 | Seymour et al. | 526/320 |

*Primary Examiner*—Harry Wong, Jr.
*Attorney, Agent, or Firm*—Sigalos & Levine

[57] ABSTRACT

In the process of making optically clear hydrophilic copolymers formed by copolymerizing a glycol monoester of acrylic or methacrylic acid with an alkoxy monomer having the formula:

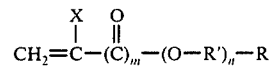

wherein R is a $C_1$–$C_4$ straight or branched chain alkoxy group, R' is a $C_2$ or $C_3$ straight or branched chain alkylene group, X is hydrogen or a methyl group, $m$ is either 1 or 0, and $n$ is an integer from 1 to 20, the improvement comprising distilling at least said alkoxy monomer under high vacuum and low temperature prior to copolymerization, promptly adding to said distilled monomer an amount of polymerization inhibitor below that which would inhibit copolymerization, but sufficient to provide a hydrated copolymer of high optical clarity, and then copolymerizing said monomer and said glycol monoester to form said hydrophilic copolymer. The invention also comprises the improved method of making hydrophilic buttons and contact lenses, particularly corneal contact lenses, from said hydrophilic copolymers.

15 Claims, No Drawings

METHOD OF PRODUCING OPTICALLY CLEAR HYDROPHILIC COPOLYMERS AND CONTACT LENSES

BACKGROUND OF THE INVENTION

Novel hydrophilic copolymers and contact lenses made therefrom are disclosed in copending application Ser. No. 647,634, filed Jan. 8, 1976, now U.S. Pat. No. 4,028,295, by one of the inventors herein. The copolymers consist essentially of a diester-free glycol monoester of acrylic or methacrylic acid and a comonomer having the formula:

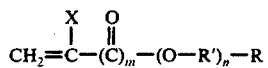

where R is a $C_1$-$C_4$ straight or branched chain alkoxy group, R' is a $C_2$ to $C_3$ straight or branched chain alkylene group, X is hydrogen or a methyl group, m is either 1 or 0, and n is an integer from 1 to 20. These hydrophilic polymers in the dry state are formed into contact lenses which are then hydrated to produce the hydrated soft contact lenses of that invention. These hydrated contact lenses are very satisfactory and of reasonable clarity, as measured by a visible light transmission of 90-92%, and occasionally, but unpredictably, are of higher clarity as, for example, 96%. It has not been possible to consistently make hydrophilic copolymers and hydrophilic contact lenses made therefrom which have very high optical clarity; i.e., which consistently give visible light transmissions in excess of 94% at 400 nanometers and, most suitably, in the range of 96 to 98%.

SUMMARY OF THE INVENTION

An improved method has been found for producing hydrophilic polymers and hydrophilic contact lenses which consistently have visible light transmissions of at least 94% and, most frequently, 96 to 98% at 400 nanometers.

In the process of making optically clear hydrophilic copolymers formed by copolymerizing a glycol monoester of acrylic or methacrylic acid with an alkoxy monomer having the formula:

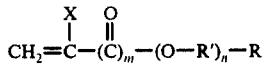

wherein R is a $C_1$-$C_4$ straight or branched chain alkoxy group, R' is a $C_2$ or $C_3$ straight or branched chain alkylene group, X is hydrogen or a methyl group, m is either 1 or 0, and n is an integer from 1 to 20, the improvement comprising distilling at least said alkoxy monomer under high vacuum low temperature prior to copolymerization, promptly adding to said distilled monomer an amount of polymerization inhibitor below that which would inhibit copolymerization, but sufficient to provide a hydrated copolymer of high optical clarity, and then copolymerizing said monomer and said glycol monoester to form said hydrophilic copolymer. The invention also comprises the improved method of making hydrophilic buttons and contact lenses, particularly corneal contact lenses, from said hydrophilic copolymers.

DETAILED DESCRIPTION

As above, the hydrophilic copolymer of the present invention consists essentially of a glycol monoester of acrylic or methacrylic acid and an alkoxy monomer. While the copolymers may contain cross-linking agents, such as ethylene glycol dimethacrylate which is normally present in a commercial grade of hydroxyethyl methacrylate, it is preferred to use the diester-free glycol monoesters as described in the above-set forth copending application and the instant invention will be described in connection with such diester-free glycol monoesters.

The particular monomers used, the method of polymerizing them, and the method of forming them into contact lenses, are those described in the noted copending application, with the critical exception of distillation of the monomers and the substantially instantaneous contacting of the distilled monomers with a specified amount of a polymerization inhibitor, as hereinafter described, that form the novel features of the instant invention.

Examples of suitable glycol monoesters are the $C_2$ to $C_4$ hydroxyalkyl acrylates and methacrylates, such as hydroxyethyl methacrylate, hydroxypropyl, acrylate, hydroxypropyl methacrylate, hydroxybutyl methacrylate, and the like, with the hydroxymethyl methacrylate preferred.

The other essential comonomer used in formulating the polymer is a non-hydroxyterminated alkoxy monomer of the general formula previously set forth. Alkoxyalkyl acrylates and methacrylates are preferred, but comonomers such as alkylcarbitol acrylates and methacrylates, alkoxytriglycol acrylates and methacrylates, and vinyl ether monomers are also suitable.

Specific examples are ethoxyethyl methacrylate, methoxyethyl methacrylate, ethoxyethyl acrylate, methyl carbitol methacrylate, ethylcarbitol methacrylate, butyl carbitol methacrylate, ethoxytriglycol methacrylate, methoxyethyl vinyl ether, vinylethoxy tetraglycol, and vinylmethoxy triglycol, with 2-ethoxyethyl methacrylate being preferred.

It is known in the usual manufacture of the glycol monoesters, such as hydroxyethyl methacrylate, that there are significant amounts of the diester also formed. In the preferred embodiment of this invention, the diester is considered to be a contaminant and, accordingly, the monoesters are purified so that there is essentially no diester present in the monomer mixture. Using hydroxyethyl methacrylate as an example, it being understood that the other glycol esters are similarly purified, the monomer formed in the usual manner can be purified to remove ethylene glycol dimethacrylate (EDMA) as set forth in U.S. Pat. No. 3,162,677. This patent shows that the use of certain solvents will enable extraction from the monoester of the diester impurity. Alternatively, the monoester can be purified of the diester content by utilizing the procedures set forth in French Pat. No. 1,567,453. This patent relies upon a combination of salting out and crystallization in solvents in order to remove the diesters from the monoesters. A preferred procedure to effect such purification is a modification of these solvent purification techniques and is described in the noted copending application.

As used herein, the terms "diester free" and "essentially no diester" are meant to include those glycol monoesters which, under testing by gas chromatography, show essentially no diester when analyzed on a Hewlett-Packard gas chromatograph, Model 5750, equipped with a digital integrator, 6 ft. × ⅛ inch 10% Carbowax 20M column and a thermal conductivity detector capable of detecting less than 0.065 mole percent (0.1% by weight) of EDMA. Stated in terms of percent by weight, there must be less than 0.1%, and approaching 0%, if not 0%, by weight of diester in the monomer mixture.

It is usual practice to add polymerization inhibitors at relatively high concentrations to monomers, in order to prevent their polymerization during shipment, storage and processing, the latter usually at elevated temperatures. In order to finally utilize these monomers for polymerization to prepare the hydrophilic copolymers of this invention, the inhibitor must first be removed. This is accomplished by distilling away the monomer from the inhibitor thereby leaving the inhibitor as a residue in the distillation vessel. The distillation is preferably carried out under vacuum to minimize the temperature to which the monomers are subjected. It is then necessary and critical that there be added to the freshly distilled and substantially inhibitor free monomers, a suitable polymerization inhibitor in suitable concentration. It is important to have the freshly distilled monomer come into immediate contact with the inhibitor; almost instantaneously or in a very short time regardless of how this is accomplished. The addition of the inhibitor to the distillation receiving flask so that the distilling monomer comes into immediate contact therewith as it is distilled over, is an effective method and the preferred way to accomplish this.

If the distillation is carried out at a high temperature (much above 50° C.), some inhibitor may be driven over into the distillation flask. The amount of such inhibitor driven over is inconsistent from batch to batch contrary to the improved method of this invention. This procedure is further undesirable since high temperature usually causes a considerable loss in yield of usable monomer. Clear-up of the equipment is also tedious and difficult in the event of such polymerization. There is also the risk of a runaway polymerization which may result in an explosion. Another disadvantage is that undesirable side reactions may take place under these higher temperature conditions. Finally, it is difficult to control the distillation under these higher temperature conditions so as to produce a monomer of consistent quality. With the instant process, it is possible to distill the monomers under high vacuum at relatively low temperatures (below about 50° C.) and still obtain a product which has the desired high light transmission.

While not entirely certain, it is conjectured that the highly purified monomer in the distillation receiver, without addition of polymerization inhibitor in accordance with the present invention, can undergo polymerization, even though the distillation receiver is cooled, to give trace amounts of homopolymer dissolved in the monomer. Subsequent handling or storage of such a highly purified monomer may also provide an opportunity for trace homopolymer formation. It is believed that the introduction of such homopolymers into the hydrophilic copolymer, through the use of such contaminated monomer, may cause the observed decrease in the clarity of the hydrated copolymer because of an incompatibility of the homopolymer with the final copolymer. The homopolymer of any of the monomers used may be responsible for the effect to a more or less degree. Addition of polymerization inhibitor as described herein prevents such poor clarity. Even though this explanation for the improvement in clarity may not be correct, the addition of the inhibitor nevertheless is totally effective.

Treatment of the alkoxy monomer by the improved process of this invention is more critical than the glycol monoester, although it is preferred to distill both and add the inhibitor to both.

Although the method is here applied to copolymers made from diester-free glycol monoesters of acrylic or methacrylic acid, it is, as previously stated, equally effective if said monoester is not diester-free or contains other cross-liking agents.

As to the inhibitor type to be instantaneously added to the monomers, any known polymerization inhibitor which is suitable may be used. It has been found that hydroquinone or the monomethyl ether of hydroquinone or a combination of both are most useful. Other suitable inhibitors include phenothiazine, p-benzoquinone, phenol, 2,6-dichloro-p-benzoquinone, p-tert-butyl catechol, di-tert-butyl-p-cresol, and mixtures thereof. The particular type of inhibitor does not form a part of this invention and simple tests as described below can be used to determine the best polymerization inhibitor to use for each given monomer.

As to the amount of inhibitor, it has been found that the addition of a few parts per million of a polymerization inhibitor to the receiving flask of the distillation system is totally effective in producing a monomer of such quality that hydrophilic contact lenses of very high clarity are produced. The exact amount depends on the effectiveness of the inhibitor. If the amount added is too great, then the subsequent polymerization reaction of the comonomer mixture, required to produce the hydrophilic polymer may be undesirably inhibited. When the monomethyl ether of hydroquinone or hydroquinone is used as the inhibitor, an amount of about 5 to 40 parts per million (p.p.m.) based on the total monomer to be distilled into the receiver has been found effective with about 5-15 p.p.m. being preferred. Usually, some small amount of inhibitor enters the receiver during distillation even under low temperature conditions, so the exact amount to be added to the receiver can be determined by simple experimentation by making small trial runs.

It has been found that the alkoxy comonomers has a greater tendency to cause a reduction in the clarity of the hydrated contact lens as compared to the glycol monoester monomer when they are not instantaneously inhibited. However, the optimum clarity is obtained when inhibitor is added to both monomers.

Tests have been developed on the individual monomers treated by the improved process of this invention, which can be used to predict whether their use in making hydrophilic copolymers and contact lenses will yield hydrated contact lenses of high optical clarity, for example, above 94% light transmission at 400 nanometers (nm) wavelength.

The test used to predict the suitability of the alkoxy comonomer, such as ethoxy ethyl methacrylate (EOEMA) consists of adding one volume of the test monomer to 10 volumes of a mixture consisting of equal volume of methanol and water. The resulting solution is thoroughly mixed. The solution is placed in a 1 cm. thick quartz cell of a UV spectrophotometer as a model Beckman DB. A light transmission at 400 nm of at least about 45%, gives for a hydrated contact lens of about 0.2 mm. center thickness made from a copolymer containing this monomer, a light transmission of 95 to 96% at 400 nm. A transmission of about 70% at 400 nm. in the solution gives a visible light transmission of about 97 to 98% under the foregoing conditions. These latter correlations between the light transmission of the monomers and that of the hydrophilic copolymer made therefrom, refer to a combination of EOEMA with hydroxyethyl methacrylate (HEMA) to suitable quality as discussed below.

The test used to predict the suitability of the glycol monoester monomer, such as HEMA, consists of adding 1 volume of the monomer to 10 volumes of water. After the solution is thoroughly mixed, it can be filtered through a No. 1 Whatman tared filter paper under suction to isolate the polymer. The polymer is dried and its weight is determined. Sometime the amount of polymer is too small to isolate quantitatively by this method but a visible haze may be evident in the monomer/water mixture. Also, the presence of small amounts of homopolymer in the HEMA will cause the monomer to increase in viscosity. This latter conditions may also be used to qualitatively detect the presence of homopolymer and provide a warning as to its possible unsuitability. If the amount of polymer in the HEMA is less than about 0.3% based on the weight of the monomer there will usually not be an effect on the ultimate clarity of the hydrated contact lens made therefrom.

Similar tests can be readily designed for other monomers by varying the type of medium to which the monomer is added and the detection system to quantify the resulting haze.

In forming the copolymer, it is only necessary that the glycol monoester of acrylic or methacrylic acid and the alkoxy comonomer distilled and containing the polymerization inhibitor be polymerized by any of the usual polymerization procedures in the presence of a free radical initiator. Any of the usual free radical catalysts or initiators may be used. Examples of suitable catalysts are benzoyl peroxide, isopropylperoxydicarbonate, di-(sec-butyl)peroxydicarbonate and bisazoisobutyronitrile.

Polymerization temperature is generally within the range of 50°–200° F., preferably 80°–110° F., although other temperatures outside of these ranges are also operable. The reaction times vary widely depending upon temperatures, catalyst concentration, and reactants used, with anywhere from 1 to 12 days being the usual time for complete polymerization. Gelation will usually occur in several hours. Of course, the higher temperatures favor the shorter reaction time.

The amount of water absorbed in the hydrated state and the softness are a function of the structure and amount of the comonomer used. Generally, increasing the length of the comonomer side-chain increases the softness while increasing the number of OR' groups in the comonomer increases the water content of the hydrated polymer. Increasing the number of carbon atoms in the alkoxy radical R of the comonomer from 1 to 4, decreases the hydrophilicity of the resulting polymer. By regulating the amount and type of such comonomer the desired softness and hydrophilicity can be obtained.

For most satisfactory results as to proportions, the glycol monoesters of the methacrylic acid form the predominant portion of the polymer, preferably, greater than 55% by weight. It has been found for contact lenses with the most desired degree of hydrophilicity that a copolymer of a composition comprising a weight ratio of 70–90% of the glycol monoesters and 10–30% of the comonomer is preferred. Generally, the comonomer can comprise as much as 45% by weight of the copolymer to as little as 5% by weight. Generally, for polymers of this composition, the water content of the resultant lenses will vary from about 25 to 40% by weight in the hydrated state.

It is believed that inclusion of the comonomer produces polymer chains with greater segmental motion and rotational freedom at a molecular level, thereby increasing the flexibility, toughness and extensibility of the overall polymer. This, in turn, results in a polymer of improved machining qualities in the unhydrated state without sacrificing physical and optical properties upon hydration.

Polymerization is preferably carried out in containers, such as test tubes, such that cylindrical rods of the hydrophilic polymer are formed. The rods can then be cut into suitable sizes for forming into contact lenses, such as corneal contact lenses. It is common practice in this art to form "incomplete" lenses which are machined into the final dimensions suitable for a user based on a practitioner's prescription. Such incomplete lenses, usually called "bonnets", can be stored or sold as such for placing into final form by other.

It accordance with the present invention, contact lenses can be made by machining the polymer in the unhydrated state to give the necessary optical specifications in the hydrated state using presently available apparatus and procedures employed to machine "hard" lenses, and which, in hydrated state, is "soft" enough to be comfortable to the user, but still rigid enough in use to hold its optical corrections more exactly. The machining qualities of the polymer in the unhydrated state are independent of the amount of water which the polymer will absorb in the hydrated state.

The invention is further described in the following examples which are set forth for purposes of illustration in which proportions are by weight unless expressly stated to the contrary.

EXAMPLE 1

Purification of EOEMA 2-ethoxyethyl, methacrylate (EOEMA) monomer containing 65 p.p.m. of hydroquinone (HQ) as polymerization inhibitor was vacuum distilled at a temperature of 40°–45° C. and a pressure of 1–2 mms. of mercury. This is designated as EOEMA-1. A similar distillation was performed with the exception that 10 p.p.m. of HQ were added to the distillation receiver prior to the start of the distillation. This is designated as EOEMA-2.

One volume of the distillate in each case was tested by adding it to 10 volume of a 1:1 methanol:water solution as described above. The mixture was then placed in a 1 cm. cell of a Beckman Spectrophotometer and the light transmission at 400 nm. was measured. The solution containing EOEMA-1 gave a light transmission of 25% while that with EOEMA-2 gave 93%.

EXAMPLE 2

Purification of HEMA

Diester-free hydroxyethyl methacrylate (HEMA) containing 2000 p.p.m. of monomethyl ether of hydroquinone (MEHQ) as polymerization inhibitor was vacuum distilled at a temperature of 35°–40° C. and a pressure of 0.1–0.2 mms. of mercury. This is designated as HEMA-1. A similar distillation was performed with the exception that 10 p.p.m. of MEHQ were added to the distillation receiver prior to the start of the distillation. This is designated as HEMA-2.

The test described above for HEMA was carried out on HEMA-1 and HEMA-2. From the test solution with HEMA-1 there was isolated 0.3% polymer based on the weight of the HEMA, while the test solution with HEMA-2 gave no detectable polymer.

EXAMPLE 3

The procedure of Example 2 used to prepare HEMA-2 was repeated except that the HEMA contained about 0.3% of the diester, ethylene glycol dimethacrylate. This is designated as HEMA-3.

EXAMPLE 4

Hydrophilic copolymers were prepared from compositions of 80 parts HEMA and 20 parts EOEMA, by weight, utilizing the polymerization method described above and monomers are prepared in Examples 1, 2, and 3 in the combinations shown in Table I below. Hydrated contact lenses of 0.2 mm. center thickness were prepared from each of the four copolymers.

The light transmission of the lenses were measured at 400 nm. and the results are shown in Table I below:

TABLE I
Light Transmission of Hydrated Contact Lenses

| HEMA Used | EOEMA Used | % Light Transmission at 400 nm. |
|---|---|---|
| HEMA-1 | EOEMA-1 | 87 |
| HEMA-2 | EOEMA-1 | 89 |
| HEMA-1 | EOEMA-2 | 96 |
| HEMA-2 | EOEMA-2 | 98 |
| HEMA-3 | EOEMA-2 | 98 |

It will be seen from the foregoing Examples, that the greatest lens clarity, as measured by a light transmission of 98%, is obtained when both monomers are treated by the method of the present invention. When only the EOEMA is treated by the method of this invention, the clarity of the lens is somewhat less, but still high, showing that the treatment of the EOEMA is more critical for optimum clarity. This same conclusion is evident from the very low light transmissions obtained on lenses made from EOEMA which was not purified by the method of the present invention. It is noted also that the method of the invention works equally well with HEMA containing some diester.

EXAMPLE 5

The procedures of Examples 1 and 2 were repeated with the exception that the HQ inhibitor used to prepare EOEMA-2 was replaced by an equal amount of MEHQ and the MEHQ inhibitor used to prepare HEMA-2 was replaced by an equal amount of HQ. In other variations of this procedure, combinations of MEHQ and HQ were used with the total amount of inhibitor being 5 to 15 p.p.m. In all instances, hydrated contact lenses made from the hydrophilic copolymers, as in Example 4, all gave light transmissions of 98% at 400 nm. on the spectrophotometer.

EXAMPLE 6

The procedures of Example 5 were repeated except that MEHQ and HQ were partially or totally replaced by each of the polymerization inhibitors phenothiazine, p-benzoquinone, phenol, 2,6-dichloro-p-benzoquinone, p-tert-butyl catechol, di-tert-butyl-p-cresol, and combinations thereof.

In each case, contact lenses made from hydrophilic copolymers, as in Example 4, containing the monomers treated with these inhibitors or combinations thereof gave light transmissions of 98% at 400 nm. on the spectrophotometer.

Examples 5 and 6 show that any inhibitor or combination thereof can be used to realize the improved contact lenses of the present invention. The only limitation is that the inhibitor strength, as determined by its type and concentration, be sufficient to provide clear hydrated copolymers, with said concentration being below that which would inhibit the copolymerization of the monomers. Routine experimentation utilizing the disclosure and tests set forth herein will enable those skilled in this art to readily determine optimum inhibitors and concentrations thereof for any given monomer.

While the invention has been described in terms of the foregoing examples with the preferred monomers HEMA and EOEMA, it is intended that the invention cover all monomer species within the generic formulations given, all suitable inhibitors, and such alternatives, modifications and equivalents as may be included within the spirit and scope of the invention as defined by the appended claims.

What is claimed is:

1. In the process of making optically clear hydrophilic copolymers formed by copolymerizing a glycol monoester of acrylic or methacrylic acid with an alkoxy monomer having the formula:

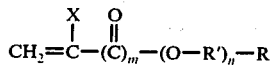

wherein R is a $C_1$–$C_4$ straight or branched chain alkoxy group, R' is a $C_2$ or $C_3$ straight or branched chain alkylene group, X is hydrogen or a methyl group, m is either 1 or 0, and n is an integer from 1 to 20, the improvement comprising distilling at least said alkoxy monomer under high vacuum and low temperature prior to copolymerization, promptly adding to said distilled monomer an amount of polymerization inhibitor below that which would inhibit copolymerization, but sufficient to provide a hydrated copolymer of high optical clarity, and then copolymerizing said monomer and said glycol monoester to form said hydrophilic copolymer.

2. The process of claim 1 wherein the glycol monoester is hydroxyethyl methacrylate and the monomer is 2-ethoxyethyl methacrylate.

3. The process of claim 2 wherein the polymerization inhibitor is selected from hydroquinone, monomethyl ether of hydroquinone, phenothiazine, p-benzoquinone, 2,6-dichloro-p-benzoquinone, p-tert-butyl catechol, di-tert-butyl-p-cresol, and mixtures thereof.

4. The process of claim 3 wherein the polymerization inhibitor is hydroquinone present in an amount of not more than about 40 p.p.m.

5. The process of claim 3 wherein the polymerization inhibitor is the monomethyl ether of hydroquinone in an amount of not more than about 40 p.p.m.

6. The process of claim 3 wherein the polymerization inhibitor is a mixture of hydroquinone and monomethyl ether of hydroquinone in an amount of not more than about 40 p.p.m.

7. The process of claim 1 wherein the glycol monoester is also distilled under high vacuum and low temperature prior to copolymerization, and there is promptly added to said distilled monomer an amount of polymerization inhibitor below that which would inhibit copolymerization, but sufficient to provide a hydrated copolymer of high optical clarity.

8. The process of claim 7 wherein the polymerization inhibitor is selected from hydroquinone, monomethyl ether of hydroquinone, phenothiazine, p-benzoquinone, 2,6-dichloro-p-benzoquinone, p-tert-butyl-catechol, di-tert-butyl-p-cresol, and mixtures thereof.

9. The process of claim 7 wherein the polymerization inhibitor is hydroquinone, monomethyl ether of hydroquinone, or mixtures thereof in an amount of not more than about 40 p.p.m.

10. In the process of making an optically clear hydrophilic copolymer formed by copolymerizing hydroxyethylmethacrylate with 2-ethoxyethyl methacrylate, the improvement comprising separately vacuum distilling each of said methacrylates at a temperature below about 50° C., substantially immediately adding to the distilled methacrylates a polymerization inhibitor, and then copolymerizing said methacrylates; said polymerization inhibitor added to each said distilled methacrylates being selected from hydroquinone, monomethyl ether of hydroquinone, or mixtures thereof and being added to each said distilled methacrylates in an amount of from about 5 to 40 p.p.m.

11. The process of claim 10 wherein the polymerization inhibitor is present in an amount of from about 5 to 15 p.p.m.

12. The process of claim 1 including the step of forming a hydrophilic button or hydrophilic contact lens from said hydrophilic copolymer.

13. The process of claim 2 including the step of forming a hydrophilic button or hydrophilic contact lens from said hydrophilic copolymer.

14. The process of claim 10 including the step of forming a hydrophilic button or hydrophilic contact lens from said hydrophilic copolymer.

15. In the process of making optically clear hydrophilic corneal contact lenses from a hydrophilic copolymer formed by copolymerizing hydroxyethyl methacrylate with 2-ethoxyethyl methacrylate, the improvement comprising separately vacuum distilling each of said methacrylates at a temperature below about 50° C., substantially immediately adding to the distilled methacrylates a polymerization inhibitor, then copolymerizing said methacrylates, and shaping said copolymer into corneal contact lenses; said polymerization inhibitor added to each said distilled methacrylates being selected from hydroquinone, monomethyl ether of hydroquinone, or mixtures thereof and being added to each said distilled methacrylates in an amount of from about 5 to 40 p.p.m.

* * * * *